(12) United States Patent
Uzzo et al.

(10) Patent No.: US 7,292,993 B2
(45) Date of Patent: Nov. 6, 2007

(54) SYSTEM FOR REMOTELY MANAGING BULK PRODUCT STORAGE

(76) Inventors: Anthony M. Uzzo, Five Woodvale Rd., Branford, CT (US) 06405; Anthony M. Uzzo, Jr., 65 Cedar Knolls Dr., Branford, CT (US) 06405; James D. Gregory, Two Oleander Dr., Clinton, CT (US) 06413

( * ) Notice: Subject to any disclaimer, the term of this patent is extended or adjusted under 35 U.S.C. 154(b) by 534 days.

(21) Appl. No.: 10/072,503

(22) Filed: Feb. 6, 2002

(65) Prior Publication Data
US 2002/0107645 A1    Aug. 8, 2002

Related U.S. Application Data

(60) Provisional application No. 60/267,249, filed on Feb. 8, 2001.

(51) Int. Cl.
*G06Q 10/00* (2006.01)
(52) U.S. Cl. .............................. 705/28; 705/22; 705/35
(58) Field of Classification Search ................. 705/22, 705/28–29, 35
See application file for complete search history.

(56) References Cited

U.S. PATENT DOCUMENTS

| | | | |
|---|---|---|---|
| 5,983,198 A * | 11/1999 | Mowery et al. ............... | 705/22 |
| 6,078,850 A * | 6/2000 | Kane et al. .................... | 701/29 |
| 6,341,271 B1 * | 1/2002 | Salvo et al. ................... | 705/28 |
| 6,370,515 B1 * | 4/2002 | Diamond et al. ............. | 705/28 |
| 6,847,305 B1 * | 1/2005 | Buck ...................... | 340/870.07 |

FOREIGN PATENT DOCUMENTS

JP       02001099696 A  *  4/2001   .................. 705/28

* cited by examiner

*Primary Examiner*—Zeender Ryan Florian
*Assistant Examiner*—Vanel Frenel
(74) *Attorney, Agent, or Firm*—St. Onge Steward Johnston & Reens LLC

(57) ABSTRACT

A system for remotely managing bulk product storage in a storage location includes a computer accessible by a plurality of users; a measurer for measuring the storage level of a bulk product; a data processor associated with the measurer permitting recording of the storage level; a communicator associated with the measurer permitting communication with the computer; an access interface associated with the computer; at least one communications network permitting communication by a user to the computer and permitting communication with the computer by the communicator associated with measurer; a database accessible by the computer containing a plurality of data associated with the storage location; and a plurality of functional software modules executing on the computer for enabling a plurality of users to selectively manipulate the plurality of data associated with the storage location; including an administrative software module for enrolling storage locations and administering the system, a management software module for querying the database, a scheduling software module for scheduling the system, an authorization software module for securing the system.

18 Claims, 7 Drawing Sheets

SYSTEM FOR REMOTELY MANAGING BULK PRODUCT STORAGE

PRIOR APPLICATION

Applicant claims priority benefits under 35 U.S.C. §119(e) of U.S. Provisional Patent Application Ser. No. 60/267,249 filed Feb. 8, 2001.

FIELD OF THE INVENTION

The invention relates to a system for remotely managing bulk product storage in at least one storage location.

BACKGROUND OF THE INVENTION

Management of bulk product storage differs from management of the storage of unit products, such as discreet products like televisions, or pencils, in three key areas: measurement of the quantity of the stored product, and replenishment of the stored product, and participant roles.

Measuring the quantity of unit products stored requires inventorying the products that are to be managed. Televisions, chairs and the like may be readily inventoried as individual units. Other items may be inventoried in the packaging unit in which they are to be distributed and sold. Thus, an office supply distributor might inventory paper in units of pallets, a down chain office supply retailer might inventory the same paper in more convenient units of boxes, and the office manager of an end consumer office may inventory the same paper in reams. Significant is that each inventory unit is capable of being hand counted. Automated inventory management tools extend that capability.

Bulk products, such as oil, coal, or grain, are inherently inconvenient or impossible to measure by eye and require different inventory methods than counting definable units. Inventorying individual units is too arduous or impossible. Since, bulk products are often needed, and thus sold, in quantities of related to physical measurements, such as volume, and weight they are often inventoried as such using specialized equipment.

Replenishment of stores of bulk products are usually made by large delivery vehicles purpose built and maintained. Tanker trucks and fuel barges are common sights on roadways and waterways. These bulk product carriers are solely dedicated to transporting one product during that haul unlike carriers for unit products who may mix their cargo to reach maximum capacity. Thus, trucks or barges filled with unit products may transport several different products, such as furniture and televisions, until all usable cargo space has been filled. Mixing cargo increases the unit product carrier's efficiency and profit margin.

However, bulk product carriers are limited to transporting one bulk product during that haul. Additionally, health and safety regulations, issued by regulatory authorities, limit the ability of carriers to change the type of bulk product carried by individual pieces of equipment. Thus, for example, a carrier who places one a tanker truck in service for fuel oil may not subsequently use that truck for carrying milk or potable water. Consequently, bulk product carriers have a great need to increase the efficiency of their operations as well as managing the storage of bulk products.

Participant roles in the ownership and replenishment of bulk product stores may be often different than with those of unit quantities. Replenishment of unit quantities generally occurs at the request of the downstream purchaser. Complex business interrelationships between supplier and consumer, such as Just-In-Time delivery, have been employed to create greater efficiency in the delivery and replenishment process.

However, replenishment of a bulk product may not occur at the request of the downstream purchaser. Further, a bulk storage facility may be owned by a supplier, yet located on the property of the product consumer, such as the heating tank in a home that is supplied by a fuel dealer. In such instances, the home owner may simply have contracted to have a steady supply of heating oil delivered by the dealer. Thus, the home owner may never read the tank gauge and replenishment may occur at estimated intervals rather than when needed.

What is desired, therefore, is an effective system and method for remotely managing bulk product storage.

SUMMARY OF THE INVENTION

Accordingly, it is an object of the invention to remotely manage bulk product storage more efficiently and accurately.

Another object is to provide controlled access to the information collected on each storage location.

A further object is to make the functions of remotely managing bulk product storage available over the internet or wireless communications.

These and other objects of the invention are accomplished by the provision of a system for providing remotely managed bulk product storage.

In one embodiment, the system for remotely managing bulk product storage in a storage location includes a computer accessible by a plurality of users; a measurer for measuring the storage level of a bulk product; a data processor associated with the measurer permitting recording of the storage level; a communicator associated with the measurer permitting communication with the computer; an access interface associated with the computer; at least one communications network permitting communication by a user to the computer and permitting communication with the computer by the communicator associated with measurer, a database accessible by the computer containing a plurality of data associated with the storage location; and a plurality of functional software modules executing on the computer for enabling a plurality of users to selectively manipulate the plurality of data associated with the storage location; including an administrative software module for enrolling storage locations and administering the system, a management software module for querying the database, a scheduling software module for scheduling the system, an authorization software module for securing the system.

DETAILED DESCRIPTION OF THE DRAWINGS

Figure 1:
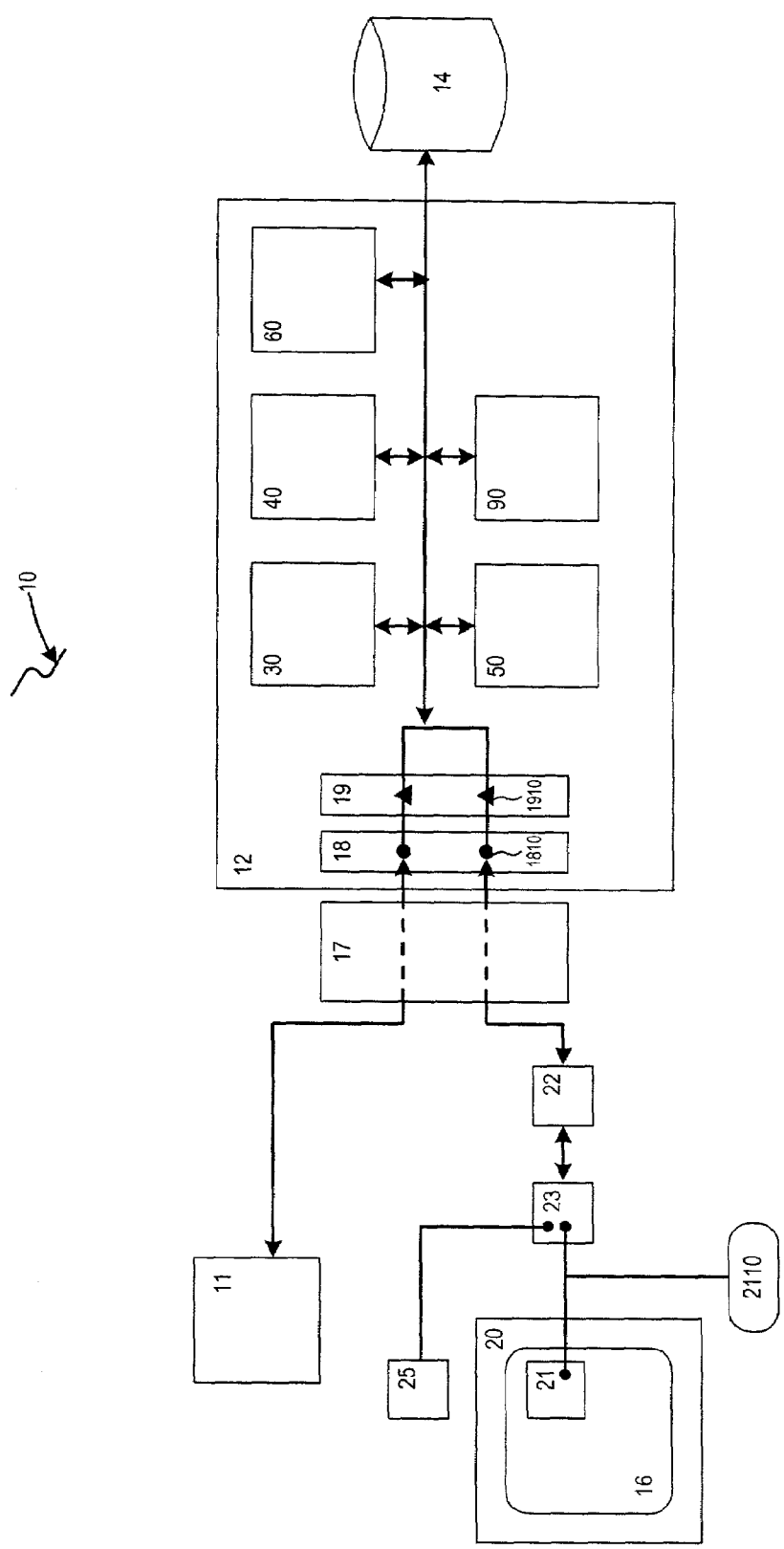
FIG. 1 is a diagram of a system 10 for remotely managing bulk product storage at a storage location in accordance with one embodiment of the invention.

FIG. 1 is a diagram of a system 10 for remotely managing bulk product storage in one storage location in accordance with one embodiment of the invention. System 10 includes one or more users 11 capable of using system 10, a computer 12, one or more databases 14, bulk product 16 at a storage location 20, a communications network 17, an access interface 18 associated with computer 12, one or more software modules 30, 40, 50, 60, 90, and one or more software applications executing on computer 12.

Remotely managing bulk product storage using system 10 in accordance with the invention in a storage location 20 may include monitoring, communicating, exchanging information, and/or performing acts that affect or result in the decision making process that augments, exhausts, manipulates, considers, or in some other way affects the quantity of bulk product 16 at the storage location 20.

Bulk product 16 is defined broadly for this invention in both its form and application and exceeds the dictionary definition of "bulk product." When used in the singular, the term is equally applicable to the plural.

Bulk product 16 may be liquid such as fuel stored in home or industrial tanks for heating or distribution. Bulk product 16 may be solid such as highway deicing salt at a maintenance depot, grain stored in a silo, or processed cereal stored in quantity for packaging in boxes familiar to supermarket shoppers. Bulk product 16 may also be waste products such as husbandry effluent stored in holding tanks for environment compliance.

The term "bulk product" is also applicable when bulk product 16 comprises two or more discrete products that are stored so as to constitute one product even though they are separable; such as aforementioned cereal, or oil and water, or differently graded aggregate.

The term "bulk product" is further applicable when bulk product 16 is a fungible product; i.e. one that is readily interchangeable with a similar product or by its nature when stored with like product becomes irreversibly miscible; for example electricity stored in a fuel cell, or unrefined petroleum in a salt dome storage facility as are common in the Gulf Coast area. Other uses and/or applications to materials, products or items that will benefit from the invention are also envisioned to be within the invention.

Storage location 20 is defined broadly for this invention and exceeds the dictionary definition of "storage location." When used in the singular, the term is equally applicable to the plural.

Storage location 20 may be any type of location used to store bulk product 16. It may be stationary. Examples of this kind are the tank hold of a residential oil heating tank or propane tank; the tank hold of a tank in a tank farm as commonly used by petroleum distributors; storage shed in a highway maintenance depot; and basin hold of a water reservoir.

However, storage location 20 may also be movable, such as the hold of a barge carrying bulk products. Storage location 20 may be temporary, such as an aggregate or cement store at a construction site.

Other types of storage locations are also envisioned in accordance with the invention. As for example, in one embodiment, storage location 20 is a delivery vehicle that comes to replenish bulk product 16 at another storage location 20, for example a tanker truck replenishing a fuel oil tank.

Storage location 20 may also be a plurality of locations used to store bulk products 16. Thus, storage location 20 may be all tank holds of all tanks in a tank farm. In such a case, a plurality of the combined quantity of bulk product 16 of tank holds may be important.

Measurer 21 provides measurement 2110 of bulk product 16 in storage location 20. Measurer 21 may be any one or plurality of devices and/or means used to measure the level of the storage of bulk product 16. For example, a pivoting swing arm float level measuring device and/or means capable of converting analog movement to digital signals may be suitable for a fuel tank. Weight and/or laser quantity measurement device and/or means may be suitable for solid bulk products. Pressure measurement device and/or means for a liquefied-gas tank may be suitable for bulk products normally in the gaseous phase at atmospheric pressure. Quantity evacuation measurement device and/or means such as flow meters may be appropriate for storage locations such as water reservoirs that are subject to draw down and variable inflow. Measurer 21 may be any other device and/or means now known or yet to become known for measuring storage levels.

Further, measurer 21 may have certain advantageous features associated with it. Thus, it may be self-contained, i.e. remote battery operated device; be self-activating, self-initiating, and-or self-charging. Therefore, in one embodiment, the measurer 21 is self-activating and initiates contact with computer 12 through associated devices and/or means. Such activation may occur upon a specific time, passage of time, level of bulk product 16, or upon a signal initiated by the delivery of bulk product 16. To preserve battery life, measurer 21 will normally be in the low power deactivated or in the sleep mode.

Associated with measurer 21 is data processor 23. Data processor 23 processes measurement 2110. This may occur by instructing measurer 21 to make a measurement, storing measurement 2110, and/or manipulating measurement 2110 in association with an event or any other process. Data processor 23 may include electronic and logic features capable of recording a plurality of measurement 2110 and executing a variety of advantageous features. Such advantageous features may include being able to associate a plurality of measurement 2110 with other references or data. In one embodiment, data processor 23 associates measurement 2110 with a temporal and/or sequential reference generated by a timer associates with data processor 23.

In another embodiment, data processor 23 associates measurement 2110 with a plurality of data signal received from transponders of deliverers, such as delivery vehicles. These signal may be both predetermined, such as identification, and non-predetermined, such as quantity of bulk product 16 delivered. Data processor 23 may further associate measurement 2110 with a predetermined level of particularity to such a delivery and/or deliverer depending on the need of any type of user 11.

In yet another embodiment, data processor 23 has the ability to compare measurement 2110 with a predetermined storage level, and creating a triggering event. Further, data processor 23 and other means and methods that allow utilizing, and relating collected data to measurement 2110 and/or other data, such as a triggering event.

Data processor 23 may be a flash-memory card, a hard drive as commonly used on computers, a punch card recorder, a biochemical recorder system, or any other device capable of recording data; it may further be a computer, of any size or shape, to perform higher level functions, such as determining from measurement 2110 the relative value of miscible gas components. In one embodiment, data processor 23 may be comprised of a memory capable of storing a plurality of measurement levels 2110. In another embodiment, data processor 23 is additionally capable of recognizing, storing, and/or manipulating data other than measurement 2110, such as delivery date, delivery means, and other data by including a transponder in data processor 23. It will be seen by someone skilled in the art that it is possible to configure data processor 23 to perform an almost unlimited variety of processing tasks associated with system 10.

Computer 12 may be of any type of computing device capable of performing the functions described herein. Computer 12 may be a personal computer, minicomputer, mainframe, supercomputer, web server, or an aggregation of computers in a distributed computer network, or a combination thereof. The computer may be physically located anywhere convenient or expeditious to system 10 or as required by law, regulation, or contract.

Database 14 preferably is a database that is generally known in the art and capable of storing a plurality of files. The invention also encompasses a single database and/or multiple databases; relational, non-relational and/or unique type of database.

It will also be seen by a person skilled in the art that a distributed processing network may be substituted for any part of computer 12 or database 14 or work in conjunction with computer 12 or database 14.

User 11 in system 10 may be an employee or agent of fuel distributor; employee or agent of delivery systems; administrator; manager; researcher, customer service personnel; regulator; accrediting organization; insurer and/or re-insurer; escrow agent; system administrator and/or manager; computer technician; accountant, vendor; subcontractor; and any other person or entity for whom authorized access to the system 10 will be beneficial. Similarly, user 11 in some circumstances may be a computer or computer system that is needed or beneficial for the system 10 or for another user 11, such as the computer of a user's insurer or governmental agency needed for necessary interactions such as regulatory matters. It will also be seen by one skilled in the art, that where one user 11 is shown a plurality may be appropriate, such as when one user 11 is shown, a committee may be appropriate, or a consultant firm, and is included in term "user".

In one embodiment, user 11 is an employee or agent of a regulatory organization such as a governmental agency charged with environmental protection and compliance. In that instance, the user 11 is monitoring the storage location 20 for regulatory compliance.

In another embodiment, user 11 is an employee or agent of an entity needing to site fungible products in a storage location 20 that may already have similar fungible bulk product 16. In that instance, the user 11 will also have need to monitor and authorize the removal of bulk product 16.

In another embodiment, user 11 is an employee or agent of an entity managing the trading of bulk product 16 or the retention of bulk product 16 in escrow.

In another embodiment, user 11 is an employee or agent of an entity operating an exchange for trading of storage potential of storage location 20. Additional users 11 may be purchasers, investors, speculators, sellers, and/or those storing bulk product 16 in storage location 20.

It will be readily seen by one skilled in the relevant art that each user 11 can be provided authorized access, or conversely denied authorized access, to any part or the entire of system 10 according to level or levels or based on individual need or benefit. Access is the capability for the usage of system 10 as represented by the functional software modules of computer 12. Users 11 are given authorized access that may include limitations or qualifications. Qualified access may not be full access, for example qualified access to system 10 may be limited in scope and time and determined uniformly or individually.

It is also readily apparent that the criteria determining, establishing, modifying, withdrawing, or disabling such authorized access can be made ahead of time, and based on one or more factors; such as the function of user 11 or the need of system 10, frequency of that function or need, regulatory compliance, or other reasons.

Conversely, criteria for determining, establishing, modifying, withdrawing, or disabling authorized access can be determined at the time the issue of the access provided to user 11 to system 10 arises. It is equally apparent that alerting, monitoring, analysis, and/or redecoration of the use, misuse, and/or abuse of the authorized access privilege may be continuous, intermittent, and/or random and include features that hinder, prevent, or deny opportunity for misuse or abuse of the authorized access privilege. Other features that secure the integrity of system 10 may also be incorporated into system 10. Associated with computer 12 is access interface 18. As used herein, access interface 18 is either hardware or software that permits user 11 and communicator 22 to access the system 10 from a plurality of computer and/or communications protocols. Thus, access interface 18 may be a modem connected to communications network 17. Access interface 18 may also be any other device or devices capable of connecting and communicating with user 11 and/or with communicator 22. It will be apparent to one skilled in the art that access interface 18 can also be a communications portal, such as a web portal.

Associated with measurer 21 is communicator 22. Communicator 22 may be a modem connected to one or more communication networks 17 or any other device capable of connecting and communicating over one or more communication networks 17 now known or to be developed. Communication network 17 may be a wireless voice or data network; a radio receiving, transmitting, or paging network; or a combination thereof, such as Point-to-Multipoint Wide Area Network (WAN), wireless local loop (WLL), or other network types known or to be developed. Preferably, a computer network is linked to communications network 17. Communicator 22 may also be directly linked to computer 12 where this communications network 17 is the direct link. Further, communication network 17 may be a plurality of networks and/or communication devices and/or means.

For example, user 11 may wish to instruct the communicator 22 to perform a device calibration and integrity check. Thus, the communications network 17 may include a computer network link from user 11 to computer 12 and a wireless network link from computer 12 to communicator 22.

The communication integration software 19 operates on computer 12. Communication integration software 19 permits user 11 and communicator 22 utilizing disparate platforms to communicate with the system 10. Disparate platforms are the result of using differing architectures related to hardware and/or software standards employed on microelectronic devices. For example for computers, Digital UNIX maybe the operating system employed on a computer with an Alpha central processor, Hewlett-Packard's HP-UX on a PA-RISC central processor, IBM AIX on a PowerPC based central processing unit, Sun Microsystems' Solaris operating system on a SPARC workstation. Disparate protocols that user 11 or communicator 22 may use also include wireless protocols of varying types; for example: Code Division Multiple Access (CDMA), Carrier Sense Multiple Access/Collision Avoidance (CSMA/CA), Time Division Multiple Access (TDMA), Lightweight & Efficient Application Protocols (LEAP), Global System for Mobil Communications (GSM). Similarly, the disparate protocols may be related to proprietary and patented standards such as Blackberry or Wireless Application Protocol (WAP) or may be related to Side Band Automatic Meter Reading protocols.

Preferably, the communication integration occurs through software executing on the computer 12 that receives various inputs through the communications network 17 for integrating various types of networks, such as Wireless LANs, portable computing clients, or other types of networks known or to be developed. However, the communication integration may also occur through software for interpreting data encoded utilizing an open standard such as the Extensible Mark-up Language (XML). It may also occur through hardware and/or software capable of integrating user 11 and communicator 22 communication protocols for use in accessing the system 10.

In another embodiment, system 10 includes monitor 25. Monitor 25 may be the capability of detecting AC power loss detection or water in the basement alarm, measuring fuel oil burned operation, monitoring burner efficiency, home smoke detectors and alarms, carbon monoxide detectors and alarms, glass break detection and alarm, intrusion detection and alarm, air quality monitoring, regulatory compliance monitoring, and/or any other device, means, or system now known or to be invented and suited for the type of monitoring performed, and an interface or interfaces that connect to data processor 23.

Figure 2:
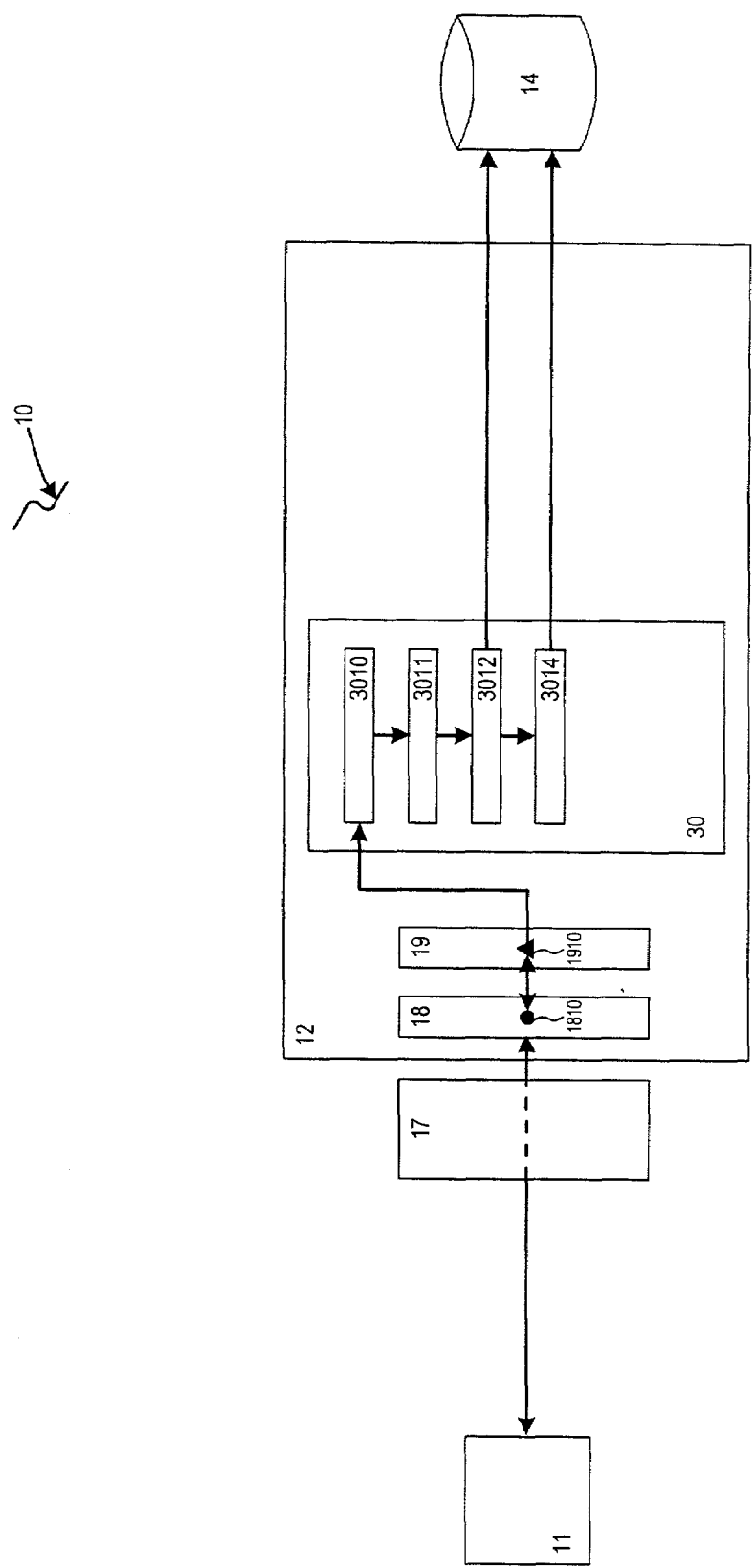
FIG. 2 depicts the administrative software module 30 of system 10 in accordance with one embodiment of the invention.

FIG. 2 depicts the administrative software module 30 of system 10 in accordance with one embodiment of the invention. Pre-authorized user 11 accesses computer 12 of system 10 through communications network 17, access node 1810 of access interface 18, and communication integration software process 1910 of communication integration software 19 and is authorized. User 11 completes the necessary enrollment request 3010 of administrative software module 30 to enroll a storage location 20 by disclosing a plurality of storage location data, such as storage potential and means to contact communicator 22 of storage location 20. Request 3010 along with the information that user 11 provided is processed by request process 3011 which creates storage location file 3012 and storage location authenticator 3014. Both are stored on database 14 so that they are associated with each other. Storage location authenticator 3014 will grant appropriate access to the system 10 to data processor 23 which stores a copy of storage location authenticator 3014.

Figure 3:
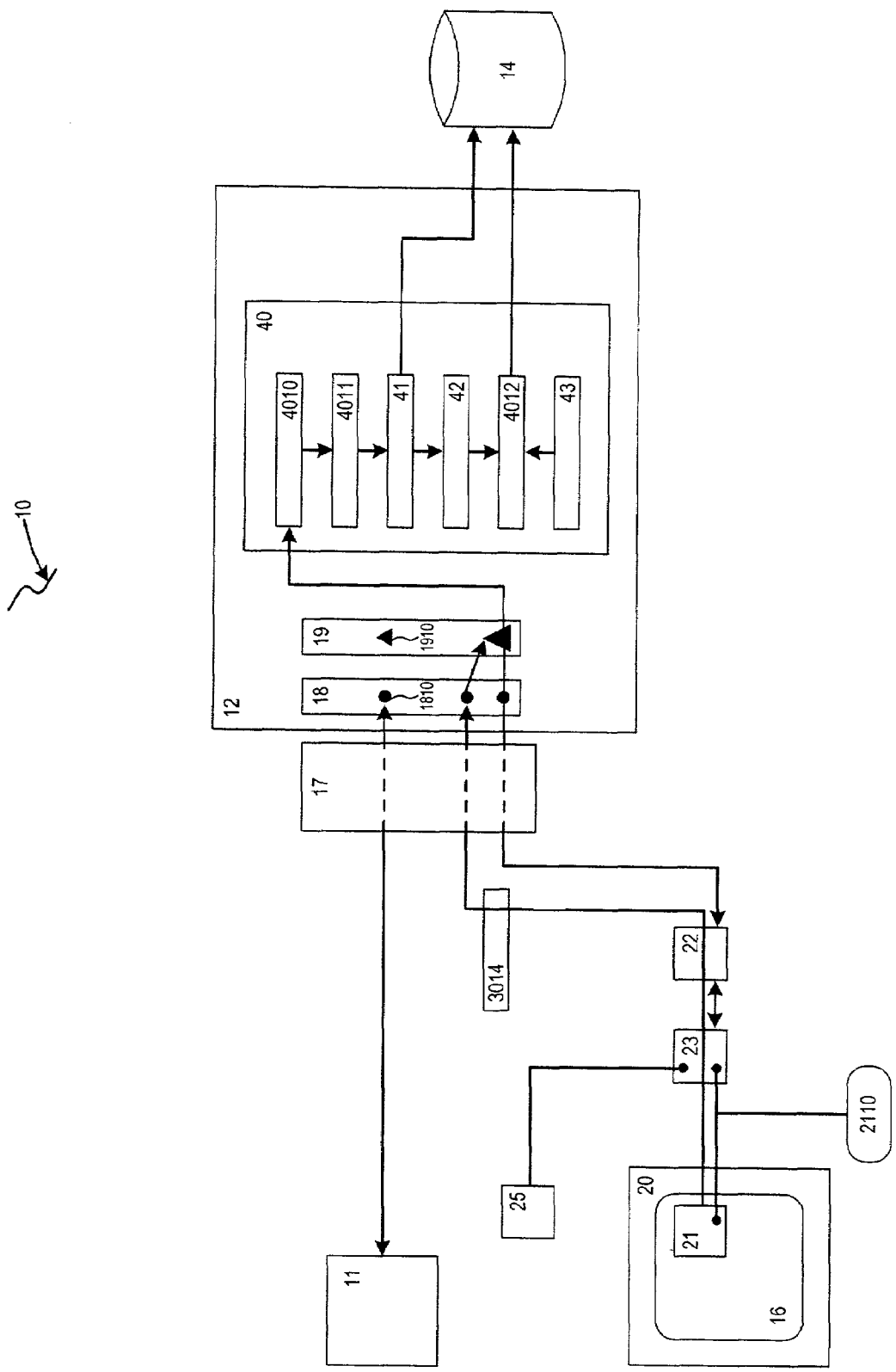
FIG. 3 depicts the data capture software module 40 in accordance with one embodiment of the invention.

FIG. 3 depicts the data capture software module 40 in accordance with one embodiment of the invention. Data capture software module 40 of computer 12 is initiated upon instruction from user 11 or upon triggering from another software module and contacts and communicator 22 by sending data request 4010 through communications integration process 1910 of communications integration software 19 and access node 1810 of access interface 18. In response, data processor 23 via communicator 22 sends authenticator 3014 by return path and data processor 23 and measurer 21 are authenticated by computer 12 through the use of authenticator 3014. At that time, measurer 21 may be instructed to make a measurement 2110 or instructions may be issued by computer 12 to access storage measurement level data and/or other data previously saved by the data processor 23. The requested information is formatted into data file 4011 stored by data processor 23 is sent by communicator 22 and is forwarded to data capture software module 40. Transmission handler 41 copies data file 4011 to a file repository of database 14 where the data can be backed up and restored. Transmission handler 41 then forwards data file 4011 to data extraction module 42. Data extraction module 42 parses data file 4011 for relevant information and saves the information in a predetermined form in record file 4012. Relevant information for record file 4012 may be any relevant information deemed useful by user 11 and may be predetermined. Data-loading module 48 saves record file 4012 to database 14.

In one embodiment, contact with data capture software module 40 is initiated by the data processor 23 associated with measurer 21. Such contact may be the result of a delivery of bulk product 16 and subsequent triggering of a new measurement 2110 by measurer 21. It may also be the result of scheduled data requests.

Figure 4:
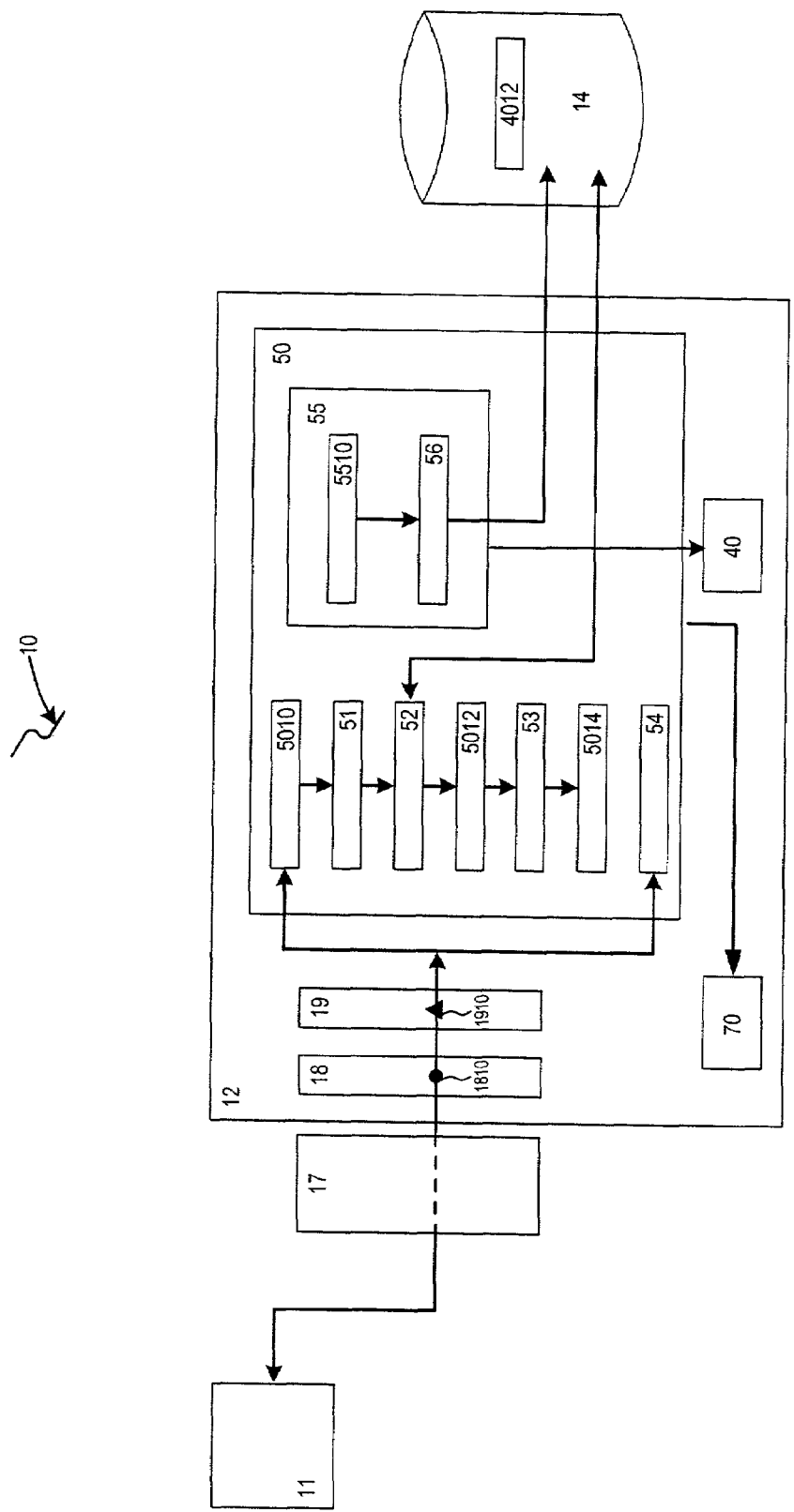
FIG. 4 depicts the management software module 50 of system 10 in accordance with one embodiment of the invention.

FIG. 4 depicts the management software module 50 of system 10 in accordance with one embodiment of the invention. Pre-authorized user 11 accesses computer 12 of system 10 through communications network 17, access node 1810 of access interface 18, and communication integration software process 1910 of communication integration software 19 and is authorized. User 11 completes query request 5010 of management software module 50. Query builder interface 51 submits query request 5010 to the query builder 52 which queries database 14 for such files as the set of record file 4012. Query builder 51 then retrieves result set 5012. Result set 5012 is the formatted by data formatter 53 into result file 5014 and forwarded to user 11 via query result interface 54.

Further management software module 50 includes scheduling software module 55 of system 10 in accordance with one embodiment of the invention. Pre-authorized user 11 accesses computer 12 of system 10 through communications network 17, access node 1810 of access interface 18, and communication integration software process 1910 of communication integration software 19 and is authorized. User 11 completes schedule request 5510 of scheduling software module 55 to initiate a scheduled activity. Such a request would typically include identification of the storage location scheduling data and any other information deemed pertinent information. Scheduler 56 saves schedule request 5510 to database 14. Upon the scheduled instance in schedule request 5510, scheduling software module 55 passes an instruction file to data capture software module 40 to trigger the module to capture the requested data.

Schedule request 5510 may also be a request for scheduling software module 55 to trigger the creation of a report according to one or more predetermined queries at predetermined times. Thereby, upon the scheduled instance in schedule request 5510, scheduling software module 55 passes an instruction file to management software module 50 to create query request 5010 within the predetermined parameters of schedule request 5510. In one embodiment, software module 50 includes an accounting software, such as accounting module, that allows for generating billing and remittances, including credit card authorizations. Such accounting software may further have the ability to calculate and determine an annual-averaged bill on a periodic basis.

In one embodiment, software module 50 includes reporting software, such as reporting module, that according to a predetermined protocol report send the results of a query, result file 5014, via communication network 17 in the form of an e-mail, a fax, or a voice mail message, or generate a web page, such as an active server page, ftp, or any other method.

Associated with management software module 50 is delivery analysis software module 70. Delivery analysis software module 70 may include one or a plurality of software modules, such as route optimization, geographical information and/or positioning systems, personnel management, and/or any other software and/or system that allow further management and/or reporting of data associate with system 10, preferably but not necessarily limited to data associated to the delivery and/or replenishment of bulk product 16 of storage location 20.

In one preferred embodiment, software module 70 includes a route optimization software, such as route optimization module, that permit deliveries to be scheduled according to threshold storage levels of bulk product 16.

In one embodiment, software module 70 includes a geographical information system or an access interface to such a system and would be accessible over communications network 17 through the Internet, via wireless web enabled system, an/or any other convenient device and/or means. The geographical information system would associate geographical positions of storage locations, geographical positions of deliverers to known geographical data. Available and useful data may be transportation routes such as roadways, pipelines, and waterways, and their relative levels of congestion. Associated with that data in geographical information system may be route limitations, such as bridge weight or clearance limits, waterway limits on hazardous material shipment and/or other data useful and/or pertinent. Through this system, In one embodiment, software module 70 includes a personnel management system that has the ability to schedule personnel within the limitations set by regulatory authorities, such as 49 CFR 350.

It will be seen by someone skilled in the art that other management and software modules may be included.

Figure 5:
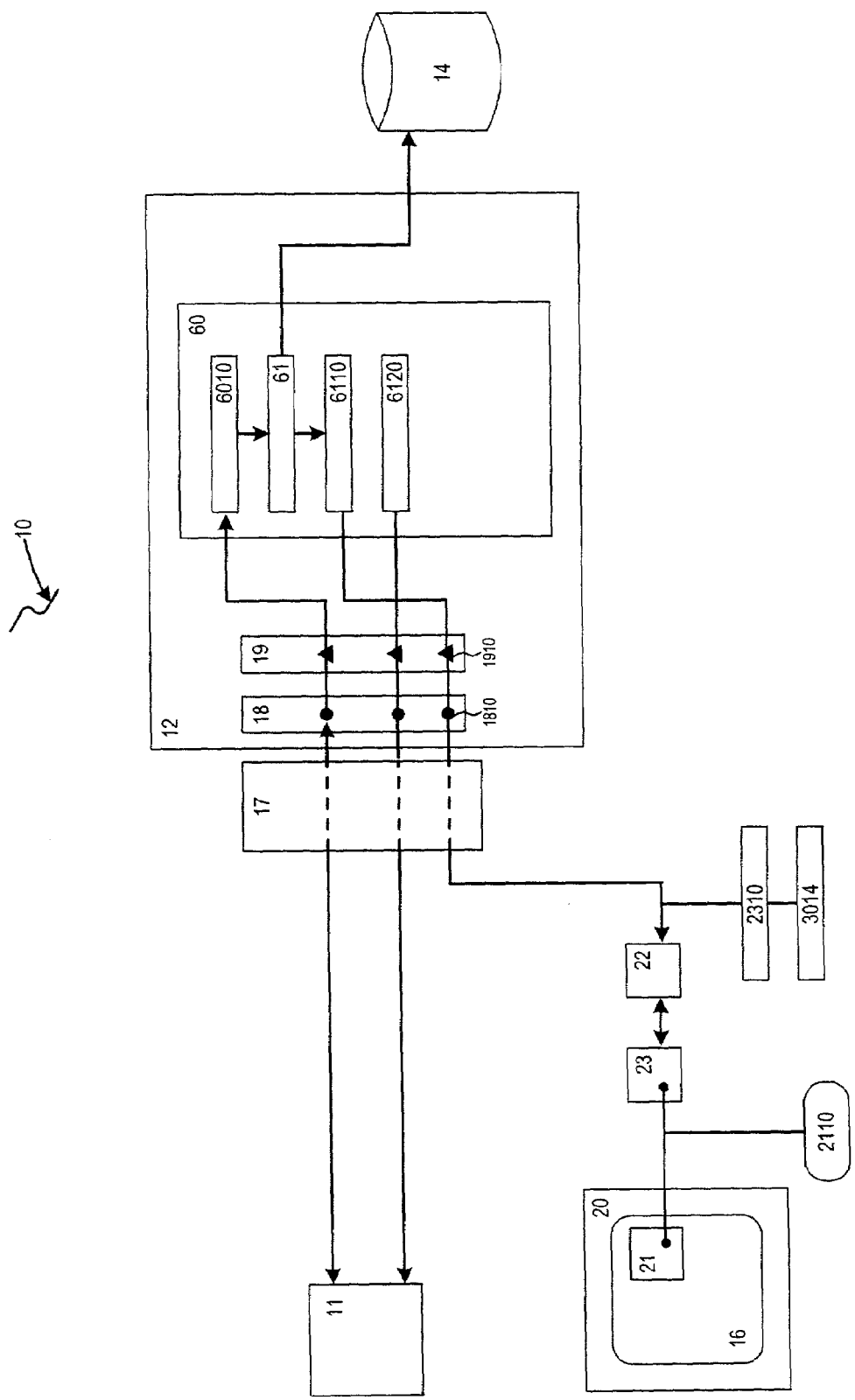
FIG. 5 depicts the monitoring software module 60 of system 10 in accordance with one embodiment of the invention.

FIG. 5 depicts the monitoring software module 60 of system 10 in accordance with one embodiment of the invention. Pre-authorized user 11 has previously enrolled storage location 20 in system 10 and created monitoring file 6010 which has been saved to database 14. Monitoring file 6010 may include all such information user 11 finds useful to be monitored. For example, if user 11 is a fuel oil distributor who has entered into an exclusive supply contract, the distributor may wish to guard against rogue deliveries. Distributor user 11 enrolls the storage location 20 for bulk product 16, a tank hold, and installs measurer 21, data processor 23, and communicator 22 associated with storage location 20. Distributor user 11 then completes monitoring file 6010 which monitoring software module 60 saves to database 14. Monitoring process 61 then forwards instruction file 6110 to data processor 23 using the communications path of communication integration software process 1910 of communication integration software 19, access node 1810 of access interface 18, and communication network 17 to communicator 22. Data processor 23 saves instruction file in its memory. When bulk product 16 is filled, it causes measurer 21 to take measurement 2110 which measurer 21 forwards to data processor 23. Data processor 23 is so configured that it recognizes that measurement 2110 exceeds parameters set in instruction file 6110. Data processor 23 configures a result file, file 2310, and by return path to computer 10 sends file 2310 along with previously-stored storage location authenticator 3014. Monitoring software module 60 then analyzes file 2310 and sends an alert 6120 to user 11 informing him that the parameters created in monitoring file 6010 have been exceeded. User 11 the may take action or further use system 10 such as accessing data base 14 by creating queries and analyzing results further.

Figure 6:
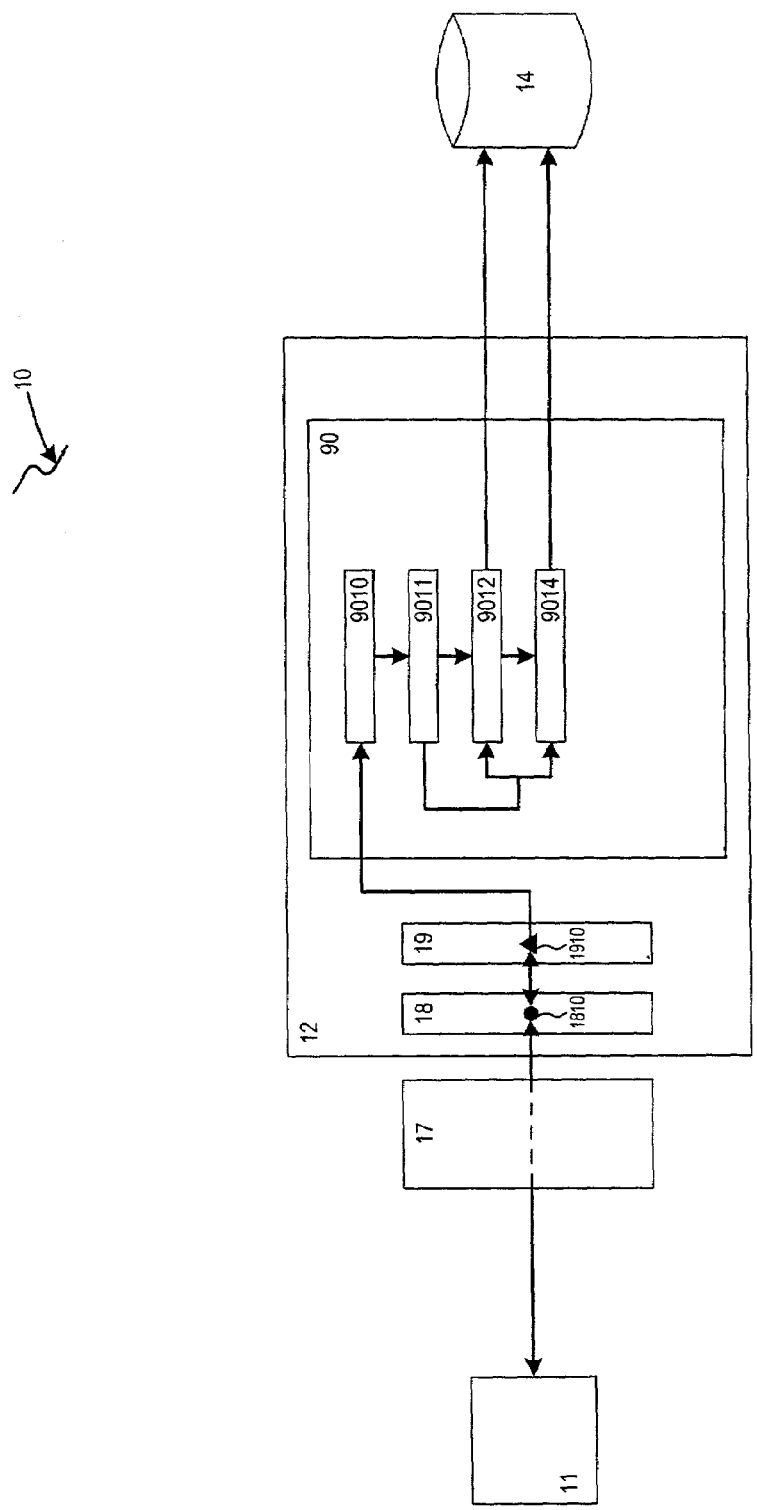
FIG. 6 depicts the authorization software module 90 of system 10 in accordance with one embodiment of the invention.

FIG. 6 depicts the authorization software module 90 of system 10 in accordance with one embodiment of the invention. Authorization software module 90 secures system 10 by managing the authorization and granting of authorization with and/or without human intervention of a system administrator. Unauthorized user 11 accesses computer 12 of system 10 through communications network 17, access node 1810 of access interface 18, and communication integration software process 1910 of communication integration software 19. User 11 who requests authorization receives qualified access to system 10 from authorization software module 90. Using the qualified access and using system 10, user 11 completes the necessary authorization request 9010, such as an application, and/or specific professional, and biographic information. Request 9010 along with the information user 11 provided is processed by request process 9011 which creates user file 9012 and authenticator 9014. Both are stored on database 14 so that they are associated with each other.

If user 11 is approved by a verification process, user 11 will be issued authenticator 9014 that will grant appropriate access to the system 10. Authenticators that may be employed for a user 11 are known to be password, passcode, voice recognition, smart card technology, or biometric recognition. The appropriateness of assigning the type of authenticator 9014 can be determined according to standards understood by one skilled in the art and predetermined by the institution and/or in compliance with external constraints.

The authorization process may include a proscribed verification process that may be attuned to the information supplied and/or level of access sought. The process for verifying the information is determined through available means and channels, such as record databases external and internal to the system 10.

Figure 7:
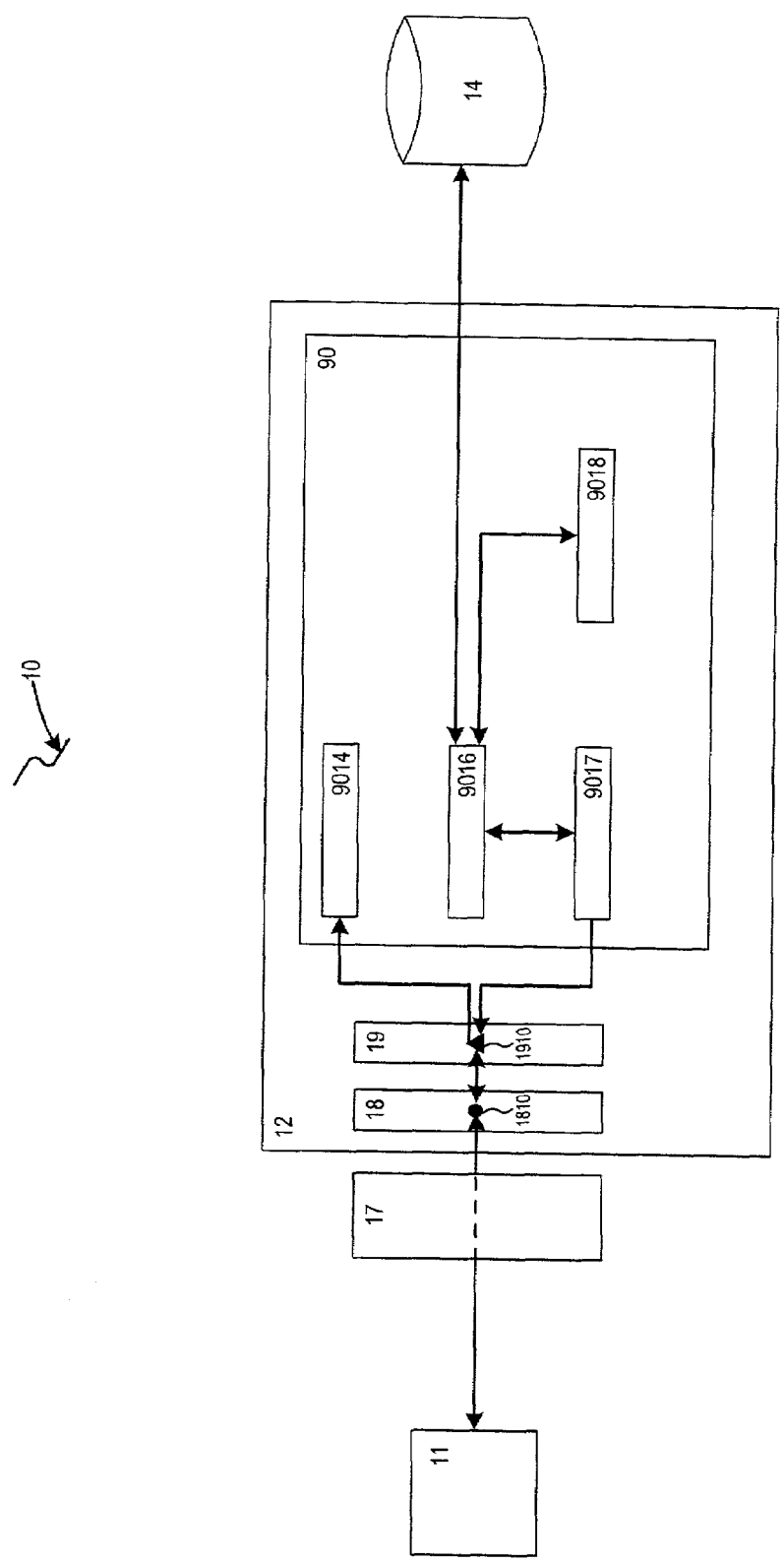
FIG. 7 illustrates an embodiment of granting user 11 authorized access to system 10 in accordance with one embodiment of the invention.

FIG. 7 illustrates an embodiment of granting user 11 authorized access to system 10. User 11 accesses computer 12 of system 10 through communications network 17 and access node 1810 of access interface 18 and communication integration software process 1910 of communication integration software 19. Upon request of computer 12 user 11 provides previously issued authenticator 9014. Computer 12 verifies authenticator 9014 through authentication process 9016 which queries database 14 for a copy of authenticator 9014. Upon verification computer 12 grants access by access process 9017 or upon failure to verify denies access at denial process 9018.

What is claimed is:

1. A system for allowing a plurality of non-associated fuel dealers to remotely managing fuel storage in a plurality of customer storage locations comprising:
   a computer accessible by a plurality of fuel dealers;
   a measurer measuring the storage level of a fuel at a customer storage location and generating a measurement signal indicative thereof;
   a data processor associated with the measurer receiving and storing the measurement signal;

a communicator wirelessly coupled to the data processor, the communicator transmitting the measurement signal to the computer via a communications network;

an access interface associated with the computer and coupling the computer to the communications network;

a database accessible by the computer containing a plurality of data associated with customer fuel storage levels for a plurality of customer accounts;

a plurality of functional software modules executing on the computer by which one of the plurality of fuel dealers selectively manipulates the plurality of data associated with a particular customer storage location; comprising an administrative software module allowing the plurality of fuel dealers to create new customer accounts administer existing customer accounts, a management software module allowing the plurality of fuel dealers to query the database for customer information associated with their customer accounts, a scheduling software module for optimizing fuel deliveries to their customer account storage locations, and an authorization software module for securing the system such that authorized fuel dealers are allowed access to their customer account information and a customer is permitted to view the storage level of a fuel at the customer's storage location, wherein a plurality of fuel dealer computers access the computer, each fuel dealer having a plurality of customer accounts to whom they supply fuel, each fuel dealer accessing the computer system via the authorization software and administering customer accounts via the administrative software.

2. The system of claim 1 further comprises a software module generating a report on a customer account.

3. The system of claim 1 wherein the communications network permitting communication of the plurality of dealer computers to the computer and permitting communication with the computer by the communicator associated with the measurer comprises a telephone network.

4. The system of claim 1 wherein the plurality of functional software modules executing on the computer for enabling a plurality of dealers to selectively manipulate the plurality of data associated with their customer account storage locations further comprises a software module for accounting.

5. The system of claim 1 wherein the plurality of functional software modules executing on the computer for enabling a plurality of dealers to selectively manipulate the plurality of data associated with their customer account storage locations further comprises a software module for accessing a geographical information system.

6. The system of claim 1 wherein said data processor further comprises a transponder for detecting a plurality of signals from a deliverer.

7. The system of claim 1 where the measurer is self contained.

8. The system of claim 1 where the communicator is self contained.

9. The fuel monitoring system of claim 1 further comprising a delivery analysis software module, including delivery optimization software, by which the dealer optimizes its schedule of deliveries to customer storage locations based upon storage levels at the customer storage locations.

10. A fuel monitoring system for allowing a plurality of non-associated fuel dealers to monitor a fuel level of a plurality of customer locations comprising:

a fuel level monitoring device for generating fuel level data;

a communicator wirelessly coupled to said fuel level monitoring device receiving the fuel level data via the wireless link;

a communication link coupled to said communicator;

a central server coupled to said interface via said communication link;

a storage device accessible by said server, said storage device receiving and storing the fuel level data;

a plurality of dealer computers coupled to said central server for accessing the fuel level data associated with their customers;

said central server formatting the fuel level data to a dealer data format;

said fuel level data presented to the dealer for display in real-time such that the dealer may optimize scheduled delivery of fuel to the customer; and an authorization software module allowing authorized fuel dealers to access their customer information and a customer is permitted to view the storage level of a fuel at the customer's storage location;

an administrative software module facilitating the creation and administration of customer accounts;

wherein a plurality of fuel dealer computers access the server, each fuel dealer having a plurality of customer accounts to whom they supply fuel, each fuel dealer accessing the server via the authorization software and administering customer accounts via the administrative software.

11. The fuel monitoring system of claim 10 wherein said communication link comprises a telephone network.

12. The fuel monitoring system of claim 10 wherein the system provides the dealer with geographical information for customer route optimization.

13. The fuel monitoring system of claim 10 further comprising accounting software.

14. The fuel monitoring system of claim 10 further comprising a delivery analysis software module, including delivery optimization software, by which the dealer optimizes its schedule of deliveries to customer storage locations based upon storage levels at the customer storage locations.

15. A centralized fuel monitoring system for allowing a plurality of non-associated fuel dealers to monitor the fuel level at customer locations comprising:

a computer accessible by a plurality of fuel dealer computers and a plurality of customer computers, each fuel dealer having a plurality of customer accounts to which they supply fuel, each customer having access to said server to check on the fuel level at the customer location;

a measurer installed at a customer location, generating a fuel signal indicative of a fuel level at the customer location;

a communicator wirelessly coupled to said measurer and receiving the fuel signal;

said communicator coupled to said computer via a communications network, said computer receiving the fuel signal;

an authorization software module allowing a fuel dealer to access customer accounts associated with the fuel dealer, said authorization software allowing a customer to access information relating to the customer's fuel level;

an administration software module allowing a fuel dealer to create new customer accounts and enroll new customer locations to be monitored;

wherein a plurality of fuel dealer computers access the computer, each fuel dealer having a plurality of customer accounts to whom they supply fuel, each fuel dealer accessing the computer system via the authorization software and administering customer accounts via the administrative software.

16. The fuel monitoring system of claim 15 further comprising a delivery analysis software module for analyzing replenishment of fuel at the customer location.

17. The fuel monitoring system of claim 15 wherein the system provides the dealer with geographical information for customer route optimization.

18. The fuel monitoring system of claim 15 further comprising an accounting software module for generating billing information associated with the customer account.

* * * * *